(12) United States Patent
Brinkmann et al.

(10) Patent No.: US 9,938,914 B2
(45) Date of Patent: Apr. 10, 2018

(54) METHODS AND SYSTEMS FOR CHARGE AIR COOLER OPERATION

(71) Applicant: Ford Global Technologies, LLC, Dearborn, MI (US)

(72) Inventors: Bernd Brinkmann, Dormagen (DE); Bernhard Gralka, Bergisch Galdbach (DE); Thomas Nitsche, Neuss (DE); Christian Jolk, Cololgne (DE); Helmut Hoyer, Koenigswinter (DE); Julian Tietze, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/202,335

(22) Filed: Jul. 5, 2016

(65) Prior Publication Data

US 2017/0009677 A1 Jan. 12, 2017

(30) Foreign Application Priority Data

Jul. 9, 2015 (DE) ........................ 10 2015 212 833

(51) Int. Cl.
| | |
|---|---|
| *F02D 41/00* | (2006.01) |
| *F02B 37/18* | (2006.01) |
| *F02M 35/10* | (2006.01) |
| *B60H 1/32* | (2006.01) |
| *F02B 29/04* | (2006.01) |

(52) U.S. Cl.
CPC ....... *F02D 41/0007* (2013.01); *B60H 1/3207* (2013.01); *F02B 29/0431* (2013.01); *F02B 37/183* (2013.01); *F02M 35/1038* (2013.01); *F02M 35/10157* (2013.01); *F02M 35/10268* (2013.01); *F02M 35/10301* (2013.01); *F02M 35/10393* (2013.01); *F02D 2200/0406* (2013.01); *F02D 2200/0414* (2013.01);
(Continued)

(58) Field of Classification Search
CPC ........ F02D 41/0007; F02D 2200/0406; F02D 2200/0418; F02D 2200/0414; F02B 29/0431; F02B 37/183; B60H 1/3207; F02M 35/10393; F02M 35/10301; F02M 35/10268; F02M 35/10157; F02M 35/1038; Y02T 10/146; Y02T 10/144
See application file for complete search history.

(56) References Cited

U.S. PATENT DOCUMENTS 9,394,858 B2 * 7/2016 Richards .............. F02M 31/205
9,650,942 B2 * 5/2017 Surnilla .................... F01P 7/10
(Continued)

FOREIGN PATENT DOCUMENTS

| DE | 102013225003 A1 | 6/2014 |
| DE | 102014105978 A1 | 11/2014 |
| JP | 2013036452 A | 2/2013 |

*Primary Examiner* — Hung Q Nguyen
*Assistant Examiner* — Xiao Mo
(74) *Attorney, Agent, or Firm* — Julia Voutyras; McCoy Russell LLP (57) ABSTRACT

Methods and systems are provided for adjusting engine operating parameters to regulate condensate formation in a charge air cooler. Based on conditions conducive to condensate formation, one or more of throttle valve position, active grille shutter opening and compressor speed may be regulated in order to decrease dew point temperature and condensation at the charge air cooler.

11 Claims, 5 Drawing Sheets

(52) U.S. Cl.
CPC ..... *F02D 2200/0418* (2013.01); *Y02T 10/144* (2013.01); *Y02T 10/146* (2013.01)

(56) References Cited

U.S. PATENT DOCUMENTS

| | | | |
|---|---|---|---|
| 9,650,946 B2* | 5/2017 | Rollinger | F02B 29/0468 |
| 9,732,690 B2* | 8/2017 | Rollinger | F02D 41/1441 |
| 2014/0109568 A1* | 4/2014 | Glugla | F02D 41/10 60/599 |
| 2014/0110488 A1* | 4/2014 | Surnilla | F02B 29/04 236/49.1 |
| 2014/0120820 A1* | 5/2014 | Glugla | F02B 29/0493 454/75 |
| 2014/0123963 A1* | 5/2014 | Glugla | F02M 25/0227 123/542 |
| 2014/0149015 A1* | 5/2014 | Pursifull | F02M 25/06 701/101 |
| 2014/0325979 A1* | 11/2014 | Morelli | F02B 37/183 60/599 |
| 2014/0352661 A1* | 12/2014 | Glugla | F02D 41/3029 123/406.19 |
| 2014/0352663 A1* | 12/2014 | Glugla | F02D 41/0085 123/443 |
| 2015/0057910 A1* | 2/2015 | Surnilla | F02D 41/144 701/108 |
| 2015/0113979 A1* | 4/2015 | Surnilla | F02B 29/04 60/599 |
| 2015/0135705 A1* | 5/2015 | Pursifull | F02B 29/0431 60/599 |
| 2015/0240730 A1* | 8/2015 | Styles | F02D 41/144 123/393 |
| 2017/0191435 A1* | 7/2017 | Rollinger | F02D 41/1441 |
| 2017/0260896 A1* | 9/2017 | Glugla | F02B 29/0493 |

* cited by examiner

METHODS AND SYSTEMS FOR CHARGE AIR COOLER OPERATION

CROSS REFERENCE TO RELATED APPLICATION

This application claims priority to German Patent Application No 102015212833.4, filed Jul. 9, 2015, the entire contents of which are hereby incorporated by reference for all purposes.

FIELD

The present description relates generally to methods and systems for controlling a vehicle engine to regulate condensate formation in a charge air cooler.

BACKGROUND/SUMMARY

The disclosure relates to a method for operating an engine assembly comprising an internal combustion engine having a turbocharger compressor of a turbocharger and having a charge air cooler, which is disposed between the turbocharger compressor and the internal combustion engine in the combustion-air flow direction, and having a throttle valve, which is disposed upstream of the internal combustion engine and downstream of the turbocharger compressor in the combustion-air flow direction.

In order to increase engine performance, modern internal combustion engines are charged with the aid of a turbocharger. The turbocharger compressor compresses ambient air, and so the pressure and the temperature increase correspondingly. The compressed air is subsequently cooled with the aid of a charge air cooler.

A charge air cooler is a heat exchanger, which, in the intake port of a charged internal combustion engine, reduces the temperature of the combustion air supplied to the internal combustion engine. The charge air cooler is installed in the intake port, between the compressor (compressor impeller of a turbocharger) and the intake valve, and dissipates a portion of the heat produced by the compression of the air in the turbocharger. As a result of the cooling, the performance and the efficiency of the internal combustion engine are increased, because, due to the reduction of the temperature of the supplied air, a greater air mass is contained in the same volume. Therefore, proportionally more fuel may be combusted. The charge air cooler therefore increases the potential power output.

Due to the cooling of charge air, the air pressure, and the dew point of the combustion air may increase. Therefore, at high ambient humidity and part load operation, for example, the temperature of the combustion air in the charge air cooler can drop below the dew point and condensate may form within the charge air cooler.

Methods and systems for estimation of an ambient humidity value and for determination of condensate formation (condensate level) in a charge air cooler are known from US 2014/0123963 A1. The ambient humidity value is determined on the basis of a limit value for charge air cooler efficiency and on the basis of a limit value for the speed of a windshield wiper of the front windshield. The humidity value is used for calculating a quantity of the condensate in a charge air cooler and for controlling internal combustion engine systems for reducing condensate formation and for reducing misfiring.

Methods and systems for reducing the corrosion of a charge air cooler and for reducing misfiring due to condensate formation are known from US 2014/0110488 A1. As a reaction to an area of condensate formation in a charge air cooler, a radiator-grill closing system is adjusted, wherein the condensate area is moved to another location in the charge air cooler. The radiator-grill closing orientation can also be controlled in reaction to the operating conditions of the vehicle and to the condensate-forming weather conditions.

The charge air cooler can incur damage during winter, however, if the condensed water freezes in the interior of the charge air cooler, for example. As such, during an acceleration, a large quantity of condensate can enter the combustion chambers of the internal combustion engine, which can result in misfiring. There is a need, therefore, to improve the operational reliability of internal combustion engines charged with a turbocharger at low external temperatures and/or under humid ambient conditions. The inventors herein have identified an approach by which the issues described above may be at least partly addressed. One example method for a vehicle engine comprises: estimating a relative humidity, and reducing a throttle valve differential pressure as a function of the relative humidity, wherein the engine comprises a chargeair cooler disposed downstream of a turbocharger compressor and upstream of an intake throttle valve.

In one example, during vehicle operation, a reduction of the throttle valve position (further closing of throttle valve) of the engine is normally carried out at elevated charge-air pressure in order to increase or optimize the speed of response to sudden requests for acceleration by the driver. According to the disclosure, a relative humidity is determined and, if a limit value for the relative humidity is exceeded, the open position of the throttle valve is increased (further opening of throttle valve) and consequently the charge-air pressure is simultaneously reduced. The reduced charge-air pressure results in a lowering of the dew point of the combustion air (within the charge air cooler) and therefore reduces the tendency for condensate formation in the charge air cooler. Relative humidity is understood to be a measure indicating the ratio of the instantaneous water vapor content with respect to the maximum possible water vapor content for a current temperature and a current pressure, since a given volume of air can absorb only a certain maximum quantity of water vapor as a function of the temperature. At 100% relative humidity, the air is fully saturated with water vapor, whereas, at a relative humidity of over 100%, the excess moisture condenses as condensate or mist. The dew point, which is also referred to as the dew point temperature, is understood to be the temperature below which, (provided the pressure remains unchanged) water vapor may precipitate out of humid air as dew or mist. At the dew point, the relative humidity is 100% or the air is (just) saturated with water vapor.

According to one embodiment, the relative humidity is compared to a threshold humidity value and the open position of the throttle valve may be changed if the relative humidity is greater than the threshold humidity value. In this way, the open position of the throttle valve is increased during critical conditions when condensate formation is expected. This is the case when the humidity is close to or at 100%. For example, the threshold humidity value may be in the range of 90% to 100%.

According to another embodiment, a throttle valve differential pressure may be determined and compared to a threshold differential pressure value and the open position of the throttle valve is changed if the throttle valve differential pressure is greater than the threshold differential pressure value. The threshold differential pressure limit value may be zero or close to zero. In this case, the throttle valve differential pressure may be measured using a pressure sensor, or the throttle valve differential pressure may be estimated by evaluating the throttle valve position. The throttle valve is opened only if a throttle valve differential pressure is present which can be reduced by opening the throttle valve. The reliability of the method is therefore increased.

In order to determine the relative humidity, an ambient temperature value and/or a charge-air temperature value and/or a charge-air pressure and/or an ambient humidity value may be estimated from corresponding sensors. The humidity value may be directly determined by a humidity sensor disposed in the charge air cooler. The relative humidity within the charge air cooler can therefore be precisely determined by capturing and evaluating and, if necessary, combining multiple measured values. This further increases the reliability of the method.

According to a further embodiment, an operating variable of a cooling-air supply device for cooling the charge air cooler may be determined and compared to a threshold operating-variable value, and an open position of a cooling-air supply device may be reduced if the operating variable is less than the threshold operating-variable value. By reducing the open position of the cooling-air supply device, temperature of the charge air cooler may be increased which may hinder further condensate formation in the cooler. In this case, an actuating signal for fully opening the cooling-air supply device can be overwritten. The operating variable may be, as an example, an opening extent of an adjustable active grille shutter system (AGS) coupled in the front end of the vehicle. Cooling air may enter the engine system including the charge air cooler via the adjustable shutters. The operating variable can be, as another example, the air-conditioning system pressure (AC head pressure). In order to operate the air-conditioning system as efficiently as possible, a low air-conditioning system pressure is striven for, which is achieved by means of an open position of the cooling-air supply device that is as large as possible. In the event of a risk of condensation formation, it is ensured that the cooling-air supply device is opened only so far that a sufficient air-conditioning system pressure is ensured. The reduced cooling effect resulting from the reduction of the cooling-air supply therefore counteracts condensate formation.

Further, a charge-air pressure of the internal combustion engine may be reduced if the operating variable is greater than the threshold operating-variable value. Therefore, the dew point may be lowered by reducing the charge-air pressure, which counteracts condensate formation, especially if it is not possible to lower the dew point by any other measures. The performance of the internal combustion engine may be affected only during conditions when there is reduction in the charge-air pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
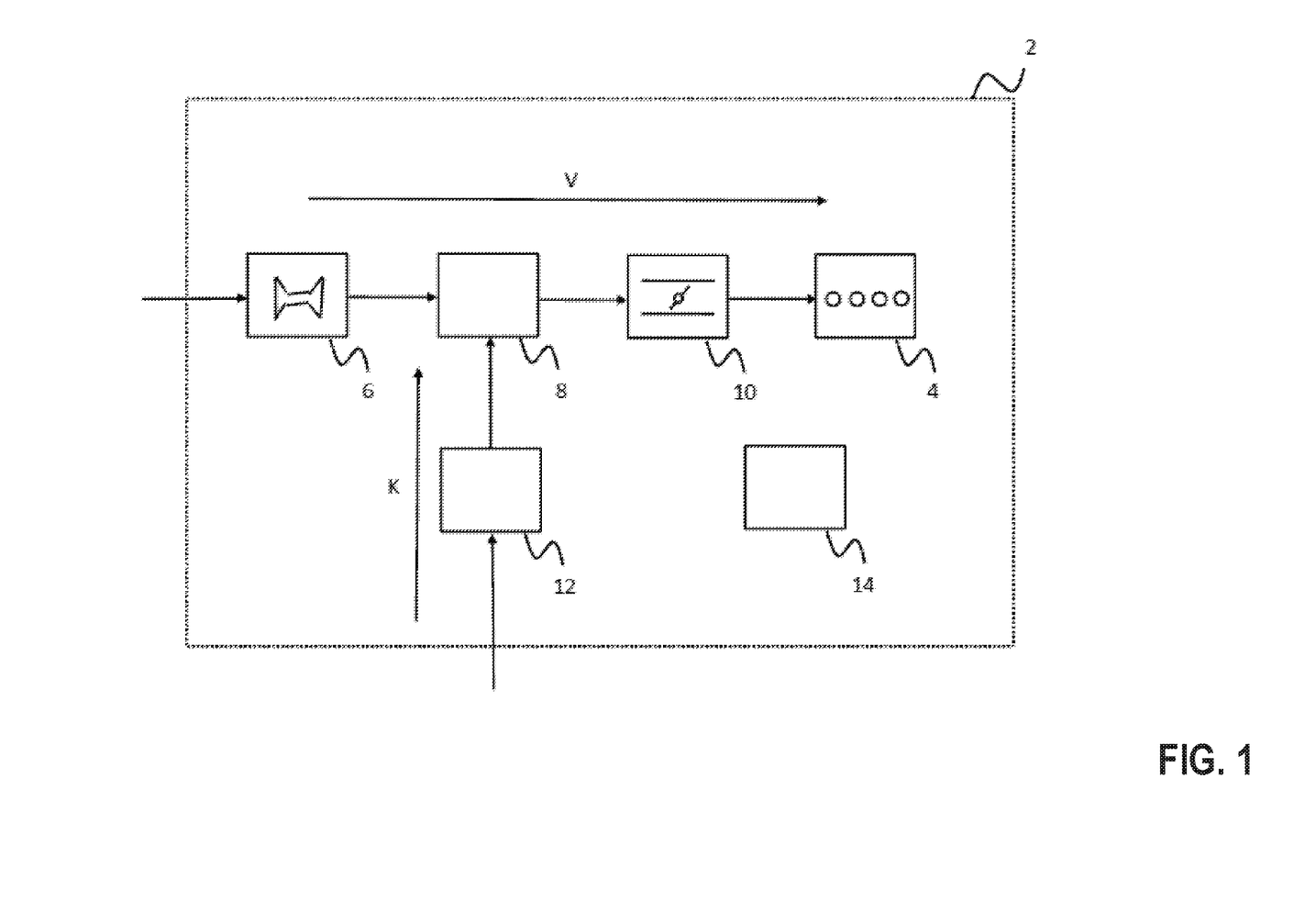
FIG. 1 shows a schematic illustration of one exemplary embodiment of an engine assembly.

The following description relates to systems and methods for regulating condensate formation in a charge air cooler. Example engine systems with a turbocharger, a charge air cooler, and a throttle are shown in FIGS. 1 and 3. An engine controller may be configured to perform a control routine, such as the example routines of FIGS. 2 and 4 to lower a condensate level in a charge air cooler, thereby reducing the possibility of engine misfire occurring due to ingestion of a higher volume of condensate from the cooler. An example of charge air cooler condensate regulation is shown in FIG. 5.

FIG. 1 shows an engine assembly 2 for driving a motor vehicle, such as, for example, a passenger vehicle. In the present exemplary embodiment, the engine assembly 2 comprises an internal combustion engine 4, a turbocharger compressor 6, a charge air cooler 8, a throttle valve 10, a cooling-air supply device 12, and a control unit 14. The internal combustion engine 4 can be a gasoline or diesel engine.

The turbocharger compressor 6 of a turbocharger, which supplies compressed combustion air to the internal combustion engine, is disposed in the intake port of the engine assembly 2 upstream of the internal combustion engine 4 in the combustion-air flow direction V. In the present exemplary embodiment, the turbocharger compressor 6 is a compressor turbine. The turbocharger compressor 6 can be driven by an exhaust-gas turbine (not illustrated) of the turbocharger, or the turbocharger compressor 6 is driven by a drive, such as, for example, an electric motor.

The charge air cooler 8 is disposed downstream of the turbocharger compressor 6 in the combustion-air flow direction V. The charge air cooler 8 is a heat exchanger for cooling the air. The charge air cooler 8 is designed for dissipating a portion of the heat produced by the compression of air in the turbocharger compressor 6.

In the present exemplary embodiment, the throttle valve 10 is disposed between the charge air cooler 8 and the internal combustion engine 4 in the combustion-air flow direction V. In order to improve the response characteristic of the internal combustion engine 4, a certain differential pressure is set via the throttle valve 10 during normal operation. In other words, the throttle valve 10 is held in a slightly closed position (not completely open) and the resultant pressure drop is compensated for by a higher charge-air pressure.

The cooling-air supply device 12 is designed for regulating the cooling-air quantity supplied to the charge air cooler 8. The cooling-air supply device 12 supplies ambient air, via the wind of the motor vehicle's own speed, in the direction of the cooling-air flow direction K, to the charge air cooler 8, in order to cool said charge air cooler 8. For the purpose of regulating the air supply, the cooling-air supply device 12 can comprise an adjustable blocking plate or a lamella grill having adjustable lamellas (not illustrated).

As described further below, the control unit 14 is designed for activating the aforementioned components of the engine assembly 2 via signal lines (not illustrated) in order to counteract a condensate formation in the charge air cooler 8 or to reduce the tendency for condensate formation. For this purpose, the control unit 14 can comprise hardware and/or software components.

Furthermore, according to a first exemplary embodiment, the control unit 14 is connected via further signal lines (not illustrated) to a temperature sensor (not illustrated) for determining an ambient temperature value, to a further temperature sensor (not illustrated) for determining a charge-air temperature value, to a pressure sensor (not illustrated) for determining a charge-air pressure, and to a humidity sensor (not illustrated) for determining an ambient humidity value. According to a second exemplary embodiment, the control unit 14 is connected via a signal line (not illustrated) to a humidity sensor (not illustrated) disposed in the charge air cooler 8 for determining the humidity of the air in a charge air cooler 8.

Figure 2:
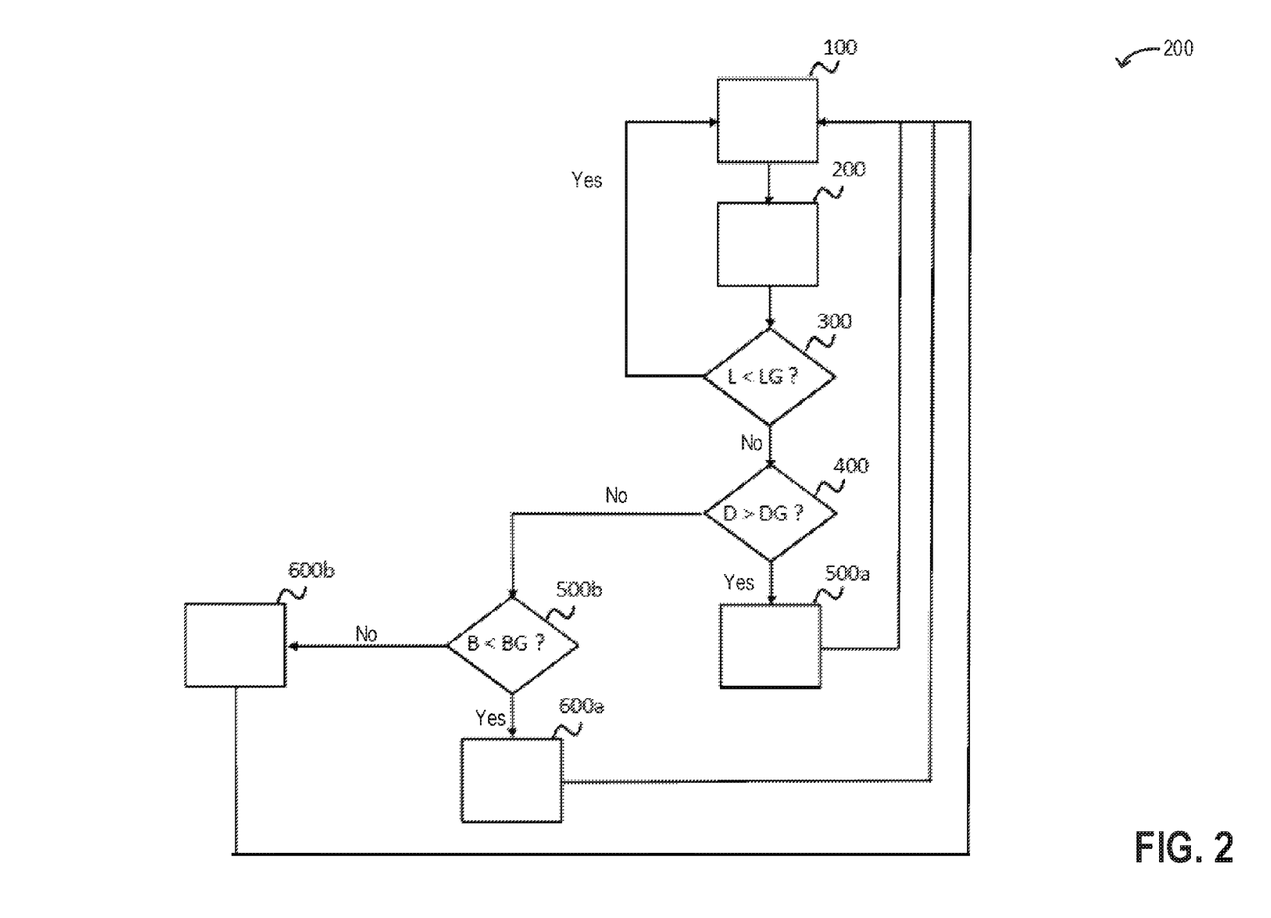
FIG. 2 shows a flow chart of one exemplary method for operating the engine assembly illustrated in FIG. 1.
Figure 3:
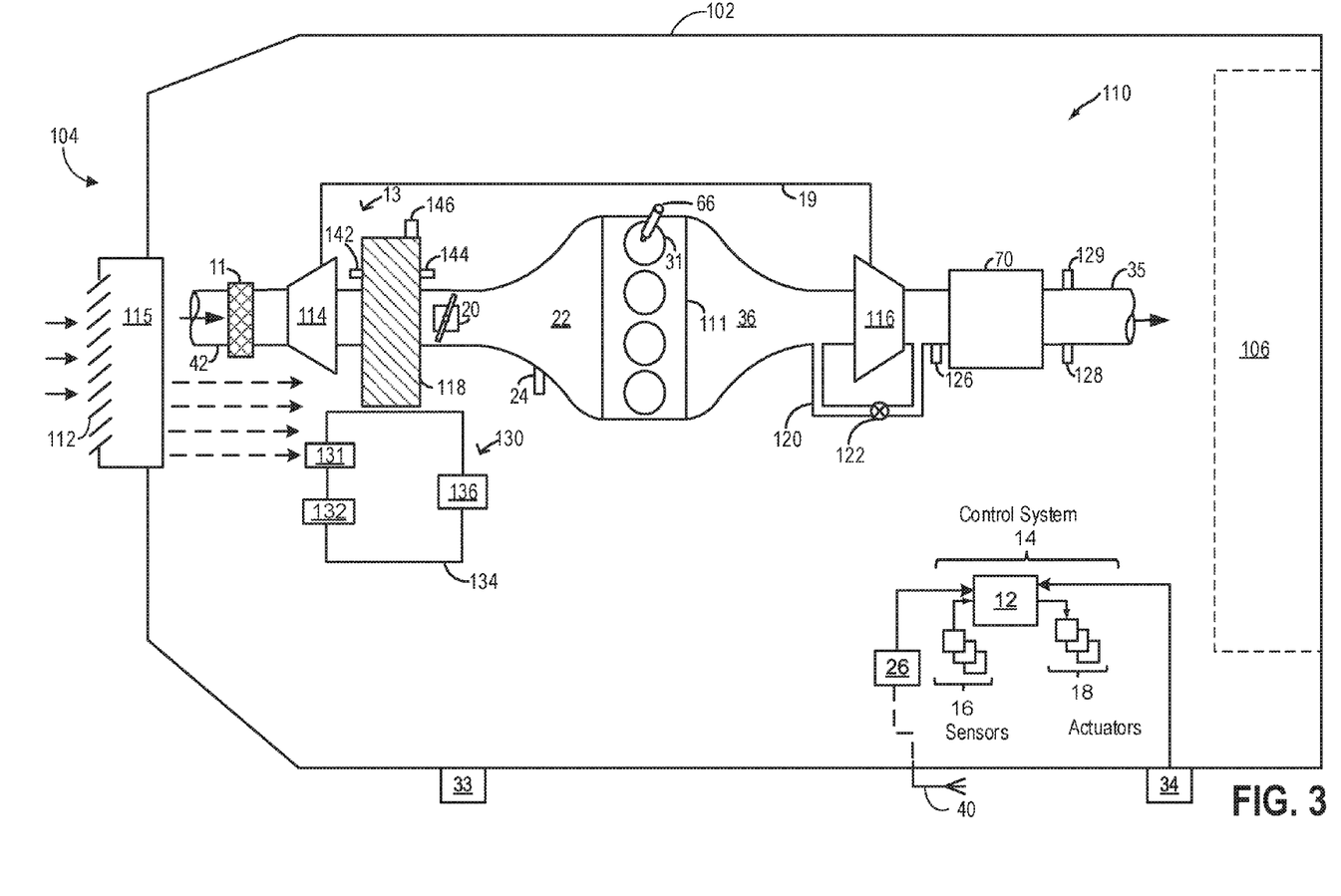
FIG. 3 shows another detailed schematic illustration of the boosted vehicle engine system.

FIG. 2 shows a sequence of one exemplary method 200 for counteracting a condensate formation in a charge air cooler (such as charge air cooler 8 of FIG. 1) and for reducing the tendency for condensate formation. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

In a first step 100, the values for the ambient temperature, the charge-air temperature, the charge-air pressure, and the ambient humidity are input by the control unit, according to the first exemplary embodiment, or a value for the humidity in the charge air cooler is input according to the second exemplary embodiment.

In a further step 200, the control unit evaluates the values and determines the relative humidity L in the charge air cooler. In a further step 300, the control unit compares the relative humidity L with a humidity limit (threshold) value LG. The humidity limit value can be in a range of 90% to 100%. In the present exemplary embodiment, the humidity limit value LG has a value of 100%. If the humidity L is less than the humidity limit value LG, a critical condition, in which condensate formation can occur, does not exist. Therefore, the method is continued by the control unit with a further query of the values in step 100.

However, if the relative humidity L is greater than the humidity limit value LG, the method is continued with a further step 400. In step 400, a throttle valve differential pressure D is determined and compared with a differential pressure limit (threshold) value DG by the control unit. The throttle valve differential pressure D can be measured using a pressure sensor, or the throttle valve differential pressure D is estimated by evaluating the throttle valve position. The differential pressure limit value DG can be zero or almost zero. In the present exemplary embodiment, the differential pressure limit value DG is zero.

If the throttle valve differential pressure D is greater than the differential pressure limit value DG, a servomotor is activated by the control unit, in a further step 500a, in order to increase the open position of the throttle valve.

As a result of the increase in the open position of the throttle valve and the resultant reduction of the throttle valve differential pressure D, the charge-air pressure of the internal combustion engine can be reduced. The reduced charge-air pressure, in turn, results in a lowering of the dew point and therefore reduces the tendency for condensate formation.

However, if the throttle valve differential pressure D is not greater than the differential pressure limit value DG, the method is continued, by the control unit, with an alternative step 500b. In the step 500b, the control unit 14 determines an operating variable B of the cooling-air supply device and compares this with an operating variable limit (threshold) value BG. The operating variable B can be an opening extent of an adjustable blocking plate or a lamella grill having adjustable lamellas for regulating the cooling-air supply.

If the operating variable B is less than the operating variable limit value BG, the open position of the cooling-air supply device is reduced in order to increase the temperature in the charge air cooler and, therefore, to counteract a condensate formation. The operating variable can be the air-conditioning system pressure (AC head pressure). In the present exemplary embodiment, the operating variable limit value BG corresponds to the maximum opening extent of the cooling-air supply device of 100%. It can also be less, however. Therefore, the open position of the cooling-air supply device is opened only if the open position is so small or if a sufficient air-conditioning system pressure is present, in order to effectuate a change in the cooling effect of the cooling-air supply device, specifically a reduction, in order to raise the combustion-air temperature in the charge air cooler above the dew point and, therefore, to counteract a condensate formation. The method is subsequently continued by the control unit 14, with the step 100.

If the operating variable B is greater than the operating variable limit value BG, the method is continued by the control unit, with an alternative step 600b. In step 600b, the control unit 14 effects a reduction of the charge-air pressure of the internal combustion engine 4. Therefore, the dew point is lowered via the reduction of the charge-air pressure, which counteracts a condensate formation, only if it is not possible to lower the dew pressure by any other measures. Therefore, a power reduction due to the reduction in charge-air pressure results only if all other measures for counteracting a condensate formation in the charge air cooler 8 or for reducing the tendency for condensate formation cannot be carried out or fail.

The method is subsequently continued by the control unit, with the step 100. The operational reliability of an internal combustion engine charged with a turbocharger is therefore improved at low external temperatures and/or very humid ambient conditions at maximum power output.

FIG. 3 shows another example embodiment of a boosted engine system 110. In one example, the engine system 110 may be the engine system 2 as discussed in FIG. 1. Engine system 110 may be included in a vehicle such as an on-road vehicle, among other types of vehicles. While the example applications of engine system 110 will be described with reference to a vehicle, it should be appreciated that various types of engines and vehicle propulsion systems may be used, including passenger cars, trucks, etc.

In the depicted embodiment, engine 111 is a boosted engine coupled to a turbocharger 13 including a compressor 114 driven by a turbine 116. Specifically, fresh air is introduced along intake passage 42 into engine 111 via air cleaner 11 and flows to compressor 114. The compressor may be a suitable intake-air compressor, such as a motor-driven or driveshaft driven supercharger compressor. In the engine system 110, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 3, compressor 114 is coupled, through charge air cooler (CAC) 118 to throttle valve 20. Throttle valve 20 is coupled to engine intake manifold 22. From the compressor, the compressed air charge flows through the charge air cooler 118 wherein it is cooled. The cold compressed air then flows to the intake manifold via the throttle valve 20. In one example, the throttle valve 20 may be the throttle valve 10 and the CAC 118 may be the charge air cooler 8 of FIG. 1. The charge air cooler 118 may be an air-to-air (as depicted) or air-to-water heat exchanger, for example.

During engine operation, due to the higher pressure of air charge, the dew point temperature may increase at the CAC 118. At higher ambient humidity and part load operation, the temperature of the compressed air in the CAC 118 can drop below the dew point and condensate may form within the charge air cooler. If a higher volume of condensate is purged to the intake manifold, engine misfires may occur. Also, stagnation of condensate at a specific location for a prolonged period of time may cause corrosion in the CAC 118. In another example, if there is an increase in CAC 118 condensate level, there may be an increase in the heating need of the CAC 118 such that the temperature of the CAC 118 may be increased in order to cause a slowdown in condensate formation. A first set of sensors 142 including CAC inlet air temperature and pressure sensor may be coupled to the inlet of the CAC 118, and a second set of sensors 144 including a CAC outlet air temperature and pressure sensor may be coupled to the outlet of the CAC 118. A CAC humidity sensor 146 may also be coupled to the CAC 118.

During engine operation, in order to improve the response characteristic of the internal combustion engine 100, a certain differential pressure may be set across the throttle via adjustments to an opening (e.g., degree or amount of opening) of the throttle valve 20. The differential pressure may represent a difference between a charge air pressure downstream of the compressor (also at and downstream of the charge air cooler) relative to a charge air pressure downstream of the throttle valve (and in the intake manifold). In other words, the throttle valve 20 may not be held in a completely open position and the resultant pressure drop may be compensated for by a higher charge air pressure which is generated downstream of the compressor and the CAC 118. By increasing the opening of the throttle valve 20, the pressure drop may be decreased and the charge air pressure at the charge air cooler and upstream of the throttle valve may be correspondingly decreased. A decrease in charge air pressure may result in lowering of dew point temperature in the CAC 118, thereby causing lesser condensation at the CAC 118.

In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 114. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

As shown in FIG. 1, exhaust from the one or more exhaust manifold sections is directed to turbine 116 to drive the turbine. When reduced turbine torque is desired, some exhaust may be directed instead through a waste gate 120, by-passing the turbine. Flow of exhaust via the waste gate 120 may be controlled via a waste gate valve 122. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

Active grille shutters (AGS) 115 may cover a front region of the vehicle spanning from just below the hood to the bottom of the bumper, for example. In some embodiments, all individual grilles 112 in the AGS 115 may be moved in coordination by the controller. In other embodiments, grille shutters may be divided into sub-regions and the controller may adjust opening/closing of each region independently. AGS 115 provide openings for receiving air flow through or near the front end of the vehicle and into the engine compartment. The airflow includes ambient airflow and airflow created via vehicle motion. Such air flow may then be utilized by radiator and other components to keep the engine and/or transmission cool. In one example, the air entering the engine system via the AGS 115 may be directly used to cool the charge air (exiting the compressor 114) at CAC 118. Temperature of the CAC 118 may be regulated by adjusting the opening of the AGS 115.

Further, an air-conditioning (AC) system 130 may receive ambient air flow via the AGS 115. The air conditioning system may include an AC compressor 136, a condenser 131, an expansion valve, and an evaporator 132. A compressor 136 may circulate refrigerant through the AC system components via the coolant line 134. In order to operate the air-conditioning system with higher efficiency, a lower AC system head pressure (that is, an AC system pressure downstream of the compressor) is desired. A lower head pressure may be achieved by increasing the opening of the AGS 115 in order to increase the external cooling air flow through the condenser 131. The cooling ambient air may also facilitate in temperature management of the AC system 130. Other under hood components (fuel system, batteries, etc.) may benefit from the cooling ambient air flow as well.

AGS 115 are moveable between an open position and a closed position, and may be maintained at either position or a plurality of intermediate positions. This is because closing and/or partially closing AGS 115 reduces an amount of air flow received through grilles 112, reducing the aerodynamic drag on the vehicle. On the other hand the reduced air flow through the condenser may reduce the efficiency of the AC system and thus require higher AC compressor power to maintain the same AC performance. Overall this may result in decreased fuel economy. Furthermore, other fluids, which are cooled by heat exchangers located in the front opening of the vehicle may exceed their temperature limits if the cooling air flow is reduced. For example, the fluids may include a coolant to cool the combustion engine, a coolant to cool a battery of a HEV vehicle, transmission oil etc.

Therefore, AGS control strategies aim to control the lamella/louver positions such that the fuel consumption is minimized whilst keeping all fluids below their temperature limits. Maintaining the grille shutters in an open position allows for sufficient engine cooling, however, this may also decrease CAC temperature, and increase condensate formation in the CAC. The grill shutters direct airflow through the condenser 131 of the AC system and an opening of the grille shutters is further based on the AC system head pressure, the opening increased as the AC system head pressure increases. During conditions facilitating a higher level of condensate formation at the CAC 118, the opening of the AGS 115 may be reduced to a threshold opening in order to increase the CAC 118 temperature and hinder further condensation in the CAC 118. The threshold opening is based on an AC system head pressure, the threshold opening increased as the AC system head pressure increases. In one example, an AC system 130 head pressure may be reduced by increasing an output of the AC compressor 136. Increasing an output of the AC compressor 136 may include one or more of an increased compressor stroke and an increased refrigerant flow.

The in-vehicle communications system 26 may communicate with a wireless communication device 40 via various wireless protocols, such as wireless networks, cell tower transmissions, and/or combinations thereof. Data obtained from the in-vehicle communications system 26 may include real-time and forecasted weather conditions. Weather conditions, such as temperature, precipitation (e.g., rain, snow, hail, etc.) and humidity, may be obtained through various wireless communication device applications and weather-forecasting websites. Current and future weather data may be correlated with current and future travel routes as obtained by the GPS 34. In one example, the communications system 26 may access various weather maps stored on the internet or other cloud computing systems. The stored weather maps may include rain, humidity, precipitation, and/or temperature information provided as contour maps, for example. In one example, the wireless communication device 40 may relay real-time humidity data to the in-vehicle communications and entertainment system 26, and/or GPS 34, which is then relayed to the controller 12. Controller 12 may also infer humidity from a plurality of sensors or vehicle system signals. These may include rain sensors, ambient humidity sensors, wiper on/off signals, or a universal exhaust gas oxygen (UEGO) sensor and system during a deceleration fuel shut off (DFSO).

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas temperature sensor 126, CAC 118 sensors (such as CAC inlet air temperature and pressure sensors 142, CAC outlet air temperature and pressure sensors 144, CAC humidity sensor 146 etc.), exhaust oxygen sensors 128 and 129, exhaust pressure sensor, MAP sensor 24, MAF sensor, engine speed sensor, vehicle speed sensor, compressor inlet temperature sensor, compressor inlet pressure sensor, compressor inlet humidity sensor, AC head pressure sensor, etc. In addition, the control system 14 may receive signals from sensors such as sensor 33 positioned on the exterior of vehicle system 102. The sensor 33 may be at least one of an ambient air temperature sensor, an ambient air humidity sensor, and an ambient air pressure sensor. Other sensors such as additional pressure, temperature, air-fuel ratio, and composition sensors may be coupled to various locations in engine system 100. In addition, control system 14 may receive data from a global positioning system (GPS) 34 and/or an in-vehicle communications system 26 of vehicle 102. The actuators 18 may include, for example, AGS 115, throttle 20, wastegate, and fuel injector 66. The control system 14 may include a controller 12. The controller 12 may receive input data from the various sensors, process the input data, and trigger various actuators in response to the processed input data based on instruction or code programmed therein corresponding to one or more routines.

For example, based on CAC condensate level estimation from CAC 118 sensors (such as CAC inlet air temperature and pressure sensors 142, CAC outlet air temperature and pressure sensors 144, and CAC humidity sensor 146), a level of condensate accumulated in the CAC 118 may be estimated and further based on input from humidity sensor 33, ambient humidity and relative humidity leading to a risk of condensate formation at CAC 118 may be determined. In response to a higher than threshold humidity level and risk of condensate formation at the CAC, a plurality of actuators including a throttle 20 and may be adjusted such that the air charge pressure may be decreased which in turn may cause a decrease in dew point temperature and lower the risk of condensate formation inside CAC. Also, in response to a higher than threshold risk of condensate formation at CAC 118, opening of AGS 115 may be decreased in order to increase the temperature at the CAC 118, since a higher temperature may hinder condensate formation.

In this way, the system of FIGS. 1 and 3 provide for a vehicle system comprising an engine; a turbocharger including an intake compressor and an exhaust turbine, a wastegate valve coupled across the exhaust turbine, a charge air cooler (CAC) coupled downstream of the compressor, an air conditioning (AC) system including an AC compressor, a throttle valve coupled downstream of the CAC, active grille shutters at a front end of the vehicle system, the active grill shutters directing ambient airflow to each of the CAC and the AC system, a manifold air pressure (MAP) sensor, an ambient humidity sensor, an ambient temperature sensor, and a controller with computer-readable instructions stored on non-transitory memory for: estimating a condensate level at the charge air cooler based on input from one or more of the ambient humidity sensor, ambient temperature sensor, and manifold pressure sensor, responsive to condensate level being higher than a threshold level when a differential pressure across the throttle valve is higher a threshold pressure, opening the throttle valve while maintaining an opening of the active grille shutters to reduce the differential pressure, and responsive to condensate level being higher than the threshold level when the differential pressure is lower the threshold pressure, maintaining the throttle valve open while reducing the opening of the active grille shutters to reduce cooling airflow to the CAC.

Figure 4:
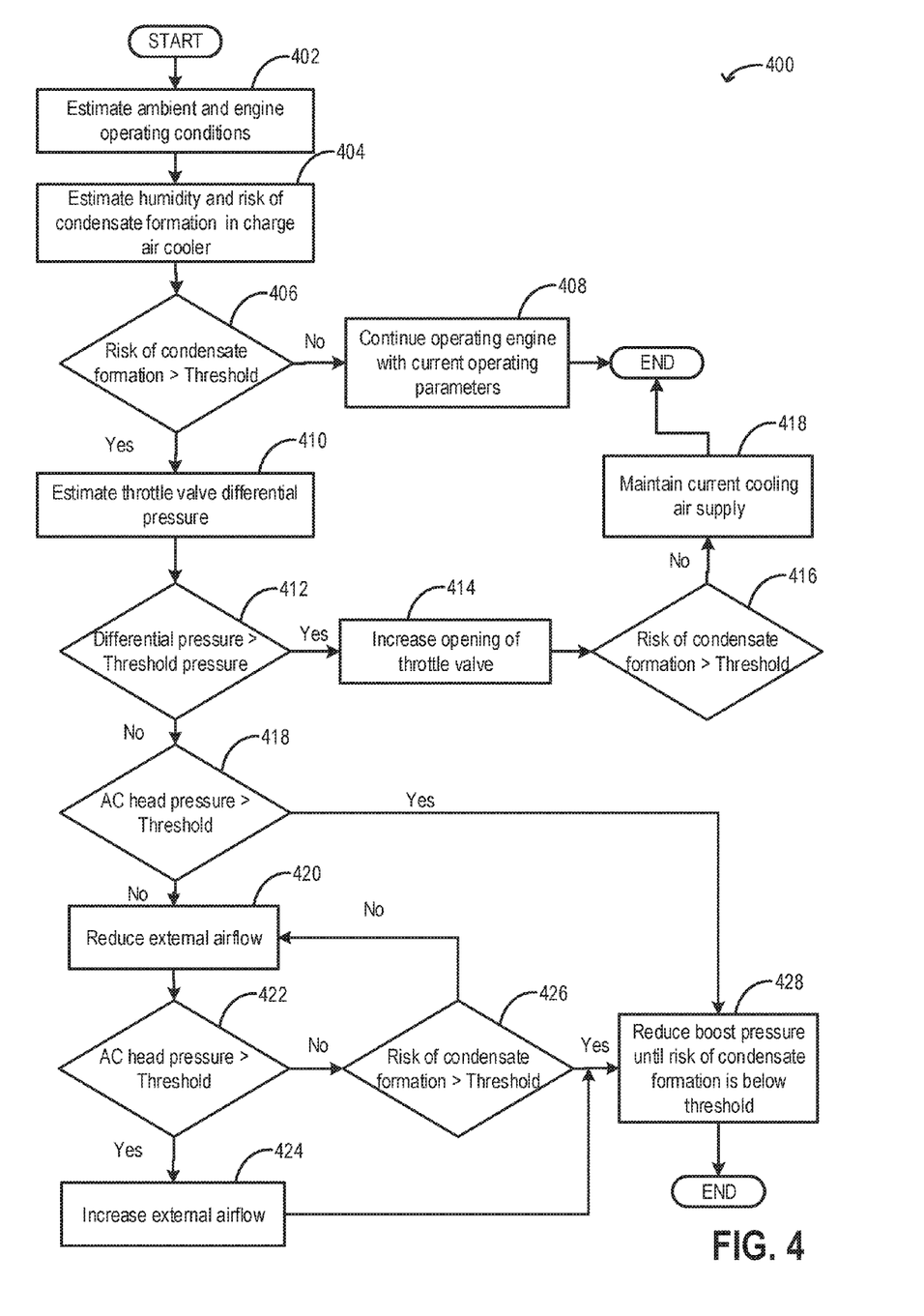
FIG. 4 shows a flow chart illustrating another example method that may be implemented to reduce condensate formation in a charge air cooler.
Figure 5:
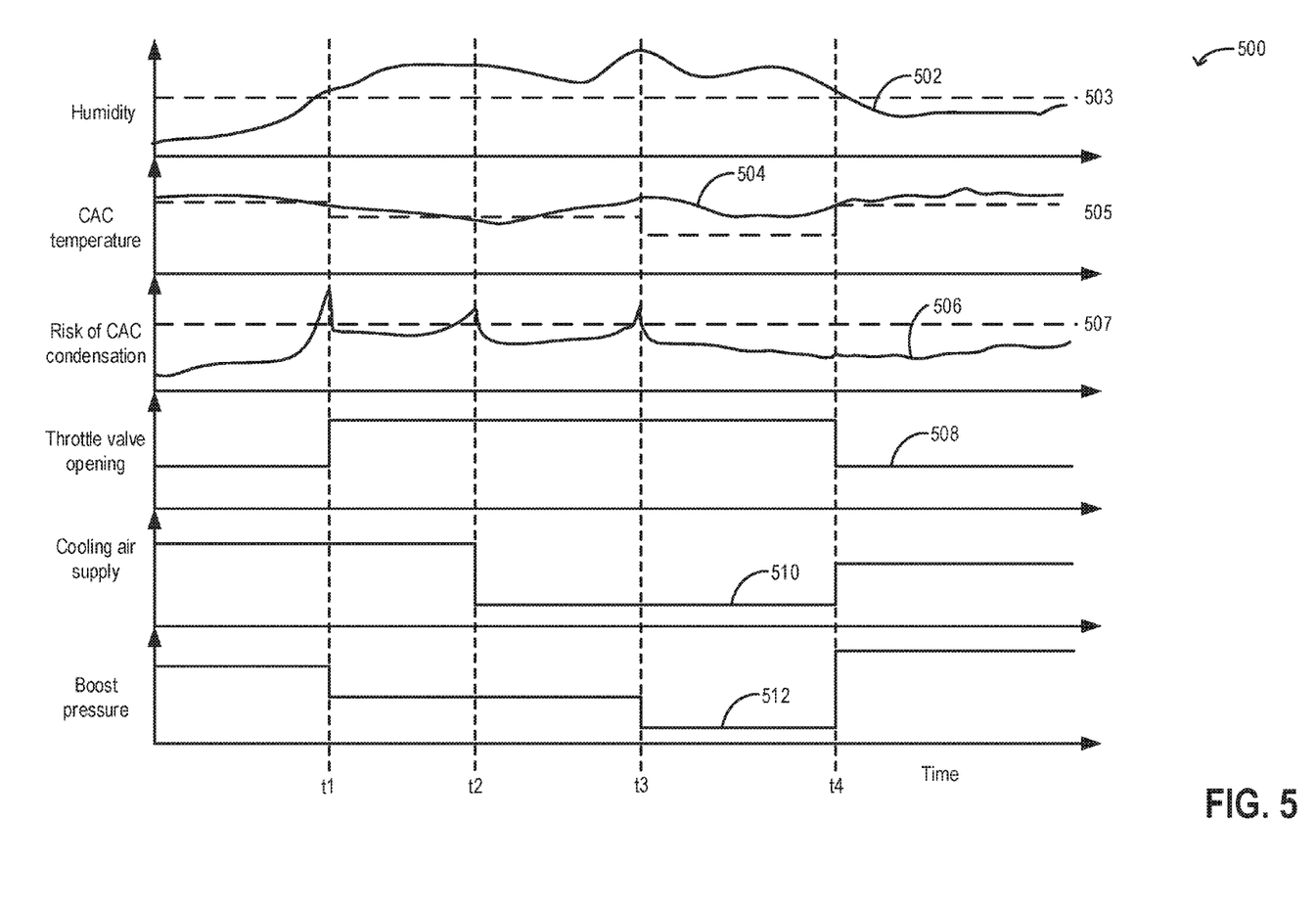
FIG. 5 shows an example of charge air cooler condensate formation control, according to the present disclosure.

FIG. 4 illustrates an example method 400 for reduction of condensate formation in a charge air cooler (CAC) (such as CAC 118 in FIG. 3). At 402, the routine includes estimating current ambient, vehicle, and engine operating conditions including, for example, ambient humidity, ambient temperature, vehicle speed, engine load, engine speed, exhaust temperature, exhaust air-fuel ratio, coolant temperature, inlet and outlet charge air temperature, and inlet and outlet charge air pressure via a plurality of vehicle system sensors.

At 404, relative humidity in/at the CAC may be estimated based on the ambient conditions and inputs from CAC sensors such as the CAC inlet air temperature and pressure sensors, CAC outlet air temperature and pressure sensors, and CAC humidity sensor. A risk of condensate formation at the CAC may be estimated from CAC conditions including the relative humidity at the CAC. In addition, a dew point temperature at the CAC may be determined. The dew point is the temperature below which moisture in air may condense and cause accumulation of water and the dew point may increase with an increase in charge air pressure. A higher dew point may be indicative of a higher risk of condensation formation in the CAC.

At 406, the routine includes determining if the risk of condensate formation is higher than a threshold value. The threshold value (of risk) may correspond to a risk of condensate formation corresponding to a humidity level of 90% to 100% in the CAC. If it is determined that the risk of condensate formation at the CAC is lower than the threshold humidity value, it may be inferred that significant condensate forming conditions are not prevalent at the CAC, therefore changes in current engine operating parameters may not be desired. At 408, the engine may be continued to be operated with current engine operating parameters.

If it is determined that the risk of condensate formation at the CAC is higher than the threshold humidity value, it may be inferred that there is a significant possibility of condensate formation in the CAC.

At 410, responsive to the risk of condensation formation, the throttle valve differential pressure may be estimated. In one example, the throttle valve differential pressure may be measured using an intake pressure sensor (such as manifold air pressure (MAP) sensor 24 in FIG. 1). In another example, the throttle valve differential pressure may be estimated from the throttle valve position. The differential pressure decreases as the throttle valve opening increases. At 412, the routine includes determining if the throttle valve differential pressure is higher that a threshold pressure value. The threshold differential pressure value may be zero or close to zero.

If it is determined that the throttle valve differential pressure is greater than the threshold differential pressure value, at 414, the engine may be operated in a first mode and the controller may send a signal to an actuator coupled to the throttle plate in order to increase the open position of the throttle valve. As a result of the increase in the open position of the throttle valve and the resultant reduction of the throttle valve differential pressure, the charge air pressure of the internal combustion engine may be reduced. The reduced charge air pressure, in turn, may result in a lowering of the dew point and therefore may reduce the risk of condensate formation in the CAC.

Upon increasing the throttle valve opening, the risk of condensate formation may be re-evaluated taking into account the current throttle valve differential pressure, relative humidity, and dew point at CAC. At 416, the routine includes determining if the current risk of condensate formation at the CAC is lower than the threshold value. If it is determined that the risk of condensate formation has decreased to below the threshold level, at 418, a cooling air supply to the CAC via an opening of the active grille shutters (such as AGS 115 in FIG. 3) may be maintained at the current level. Also, the engine may be continued to be operated with current operating parameters.

If it is determined (at 412) that the throttle valve differential pressure is lower than the threshold differential pressure value, or if it is determined (at 416) that even after opening the throttle valve, the risk of condensate formation at the CAC is higher than the threshold, a level of cooling air supply to the CAC may be estimated. In one example, the cooling air supply may be estimated based on a position (extent of opening) of a cooling air supply device such as an AGS housed in the front of the vehicle, the AGS supplying cooling air to the CAC.

At 418, the routine includes determining if the head pressure of the air conditioning (AC) system is higher than a threshold pressure. The head pressure may be estimated by a pressure sensor coupled in the AC circuit, downstream of the AC compressor. For optimal operation of the AC system, the head pressure may be maintained at a lower than threshold value. Ambient air supply via the AGS may facilitate in AC system heat dissipation and lowering of head pressure. If it is determined that the AC head pressure is higher that the threshold, the routine may proceed to step 428.

At 428, the engine may operate in a third mode wherein boost pressure may be reduced in order to further reduce the charge air pressure downstream of the intake compressor and upstream of the throttle valve, which in turn reduces condensate formation. The reduction in boost pressure may be carried out by increasing the opening of the waste gate valve and flowing a higher volume of exhaust via the waste gate, bypassing the exhaust turbine. Due to the lower volume of exhaust passing through the turbine, the turbine speed may decrease causing a consequent decrease in intake compressor speed which may in turn reduce the charge air pressure (or boost pressure). Reduction in boost pressure may be carried out as a last measure only if a further reduction in risk of condensate formation cannot be lowered by changing throttle position, and/or cooling air supply since this last measure can affect engine performance/output. In response to the reduction of the charge air pressure, the dew point may be lowered, which may reduce the risk of condensate formation in the CAC. Reduction in boost pressure may be carried out until the risk of condensate formation is below the threshold.

If it is determined at 418 that the AC head pressure is lower than the threshold, at 420, the engine may be operated in a second mode and the opening of the AGS may be reduced in order to reduce the external airflow (cooling air supply) and therefore increase the CAC temperature. Also, the dew point may be lowered which may result in lowering of the risk of condensate formation in the CAC. Further, by regulating the opening of the AGS, the location of the condensate within the CAC may be shifted, therefore reducing the risk of corrosion in the CAC caused by stagnation of condensate at a specific location for a longer duration of time.

After reducing the external airflow, at 422, the routine includes re-determining if the AC head pressure is higher than the threshold pressure. If it is determined that the AC head pressure has increased to above the threshold pressure, at 424, opening of the AGS may be increased in order to increase the external airflow (cooling air supply) and therefore reduce the AC head pressure to below the threshold pressure. The reduced AC head pressure may result in optimal operation of the AC system. Once the external airflow has been increased, the routine may directly proceed to step 428 wherein the boost pressure may be reduced until the risk on condensation is lower than the threshold risk.

If it is determined (at 422) that the AC head pressure is lower than threshold, the routine may proceed to 426. At 426, the routine includes determining if the current risk of condensate formation at the CAC is higher than the threshold value. If it is determined that the current risk of condensate formation is higher than the threshold level, the routine may move onto 428 (described above), wherein the boost pressure may be reduced until the risk of condensate formation is below the threshold.

If it is determined (at 426) that the risk of condensate formation at the CAC is lower than the threshold, the routine may proceed to step 420, wherein the external airflow may be reduced. Minor adjustments to the AGS position may be carried out based on cooling demands of a plurality of vehicle components while taking into account aerodynamic drag caused by the external airflow through the AGS. Alternatively, if it is determined that the current risk of condensate formation at the CAC is lower than the threshold, the engine may be operated with the current throttle position, and level of cooling air supply.

In this way, responsive to condensate accumulation at a charge air cooler coupled downstream of an intake compressor, the intake compressor driven by an exhaust turbine, an engine may be operated in a first mode with an intake throttle opening increased and an opening of an active grille shutter system maintained, the engine may be operated in a second mode with the intake throttle opening increased and the opening of the active grille shutter system decreased, and the engine may be operated in a third mode with the intake throttle opening increased, the opening of an active grille shutter system decreased, and an exhaust wastegate valve opening increased. The engine may be operated in the first mode until a differential pressure across the throttle valve is at or below a threshold, and then the operation may transition to the second mode while condensate level is still higher. The engine may be operated in the second mode until the opening of the AGS reaches an opening corresponding to a threshold airflow and then the operation may transition to the third mode, wherein the threshold airflow is based on AC system head pressure.

FIG. 5 shows an example operating sequence 500 illustrating regulation of condensate formation in a charge air cooler (CAC). Accumulation of condensate in a charge air cooler may cause corrosion in the cooler and subsequent ingestion of condensate into the cylinders may cause cylinder misfire. The horizontal (x-axis) denotes time and the vertical markers t1-t4 identify significant times the example operating sequence.

The first plot, line 503, shows a variation in relative humidity in the CAC over time. Dotted line 503 shows a threshold humidity level above which there is a higher risk of condensate formation in the CAC. The second plot, line 504, shows the charge air temperature at the CAC outlet. Charge air temperature at the CAC outlet may depend on charge pressure air. Dotted line 505 shows a threshold dew point temperature at the CAC outlet below which condensate formation at the CAC may be accelerated. The dew point temperature may vary based on the boost pressure. The third plot, line 506, shows a variation in the risk of condensate formation in the CAC over time. The risk of condensate formation may be estimated based on one or more of relative humidity, the dew point at the CAC and the internal and external CAC air flow. Dotted line 507 shows a threshold risk above which condensate formation may be accelerated at the CAC. The fourth plot, line 508, shows a level of the throttle valve opening. The fifth plot, line 510, shows a supply of cooling ambient air from an active grille shutter (AGS) positioned at the front end of the vehicle. The sixth plot, line 512, shows a change in boost pressure over time.

Prior to time t1, the relative humidity at the CAC as estimated by a plurality of temperature, pressure, and humidity sensors coupled to the engine system is lower than the threshold level. Also, the charge air temperature at the CAC outlet is higher than the dew point. Therefore, during this time, based on relative humidity and charge air temperature at the CAC outlet, the risk of condensate formation at the CAC is lower than the threshold risk. The throttle valve may be maintained at a partially closed position which creates a differential pressure at the intake manifold. The boost pressure may be maintained at a desired level based on driver demand and engine operating conditions.

At time t1, the relative humidity may increase to higher than the threshold humidity, and also the charge air temperature at the CAC outlet may decrease to below the dew point. Consequently, there may be an increase in the risk of condensate formation in CAC. In response to the higher than threshold risk of condensate formation in the CAC, the throttle valve opening may be increased to a maximum permissible level. Due to the increase in the throttle valve opening, there may be a drop in the differential pressure in the intake manifold which may in turn reduce the charge air pressure. As a consequence of the decrease in charge air pressure, the dew point at the CAC may decrease. Even though there is no appreciable change in the charge air temperature at the CAC outlet, due to the lowering in dew point, the charge air temperature may become higher than the dew point. In response to the higher than dew point charge air temperature, the risk of condensate formation may decrease to below the threshold. Also, due to the increase in throttle valve opening, the boost pressure may decrease.

Between time t1 and t2, the throttle valve may be maintained at a maximum possible opening level, and it may be observed that the charge air temperature at the CAC outlet may continue to remain above the dew point, and the risk of condensate formation at the CAC may be maintained at a lower than threshold level.

However, at time t2, the charge air temperature may decrease to below the dew point and there may be a higher than threshold increase in the risk of CAC condensate formation. Therefore, in order to lower the risk, at time t2, the cooling air supply may be lowered by reducing the opening of the AGS. The AGS opening may be reduced to a certain level taking into account cooling needs of other vehicle components such as the air conditioning system. By reducing the cooling air supply to the CAC, the charge air temperature at the CAC outlet may be increased to above the dew point which may facilitate in lowering the risk of condensate formation in the CAC.

Between time t2 and t3, the throttle valve may be maintained at a completely open position and the AGS opening may be maintained at the lowest permissible level. During this time, the charge air temperature at the CAC outlet may continue to remain above the dew point and risk of condensate formation at the CAC may be maintained below the threshold level.

However at time t3, an increase in relative humidity may be observed at the CAC which may cause an increase in the risk of condensate formation at the CAC to above the threshold level. Since it may not be possible to make any further changes to the throttle position and/or to the AGS opening, in order to reduce the risk of condensate formation, at time t3, the boost pressure may be reduced. In order to reduce the boost pressure, a higher volume of exhaust may be diverted via the waste gate bypassing the exhaust turbine. In order to divert the exhaust via the waste gate, the waste gate valve opening may be increased. Due to the lower volume of exhaust passing through the turbine, the turbine speed may decrease which may in turn reduce the speed of the intake compressor. Consequently, there is a decrease in the boost pressure which causes a further reduction in the charge air pressure. Due to the decrease in charge air pressure, the dew point at the CAC may further decrease. Due to the lowering of dew point, the charge air temperature at the CAC outlet may be maintained above the dew point. In response to the higher than threshold (dew point) charge air temperature at the CAC outlet, the risk of condensate formation at the CAC may be reduced to below the threshold level.

Between time t3 and t4, the waste gate valve opening may be maintained at a higher degree and the boost pressure may be maintained at a lower level in order to maintain a lower than threshold risk of condensate formation at the CAC. At time t4, the relative humidity at the CAC may reduce to below the threshold humidity. In response to the lower than threshold humidity, and the higher than dew point charge air temperature at the CAC outlet, the risk of condensate formation at the CAC may further reduce. In order to provide the desired boost to the engine for optimal engine operations, the boost pressure may be increased by reducing the opening of the waste gate valve. Also, the throttle valve opening may be reduced to increase the throttle valve differential pressure and the AGS opening may be increased to increase the cooling air supply, as desired for optimal engine operations. Post time t4, the engine may be operated with optimal throttle valve opening, boost pressure, and cooling air supply based on driver demand, and engine operating conditions. Therefore, the performance, and fuel economy of the engine may be improved once the risk of condensate formation at the CAC reduces.

In this way, responsive to condensate accumulation at a charge air cooler (CAC), an opening of a throttle coupled downstream of the CAC may be selectively increased, and an opening of a grill shutter may be selectively reduced to reduce airflow across the CAC, wherein the condensate accumulation is based on a relative humidity at the CAC.

In one example, a method for a vehicle engine comprises, estimating a relative humidity, and reducing a throttle valve differential pressure as a function of the relative humidity, wherein the engine comprises a charge air cooler disposed downstream of a turbocharger compressor and upstream of an intake throttle valve. The preceding example method further comprises, additionally or optionally, comparing the relative humidity with a humidity limit value, and wherein the reducing includes adjusting a degree of opening of the intake throttle valve when the relative humidity (L) is greater than the humidity limit value. Any or all of the preceding examples further comprising, additionally or optionally, comparing the throttle valve differential pressure to a differential pressure limit value, and further adjusting the degree of opening of the intake throttle valve if the differential pressure is greater than the differential pressure limit value. In any or all of the preceding examples, additionally or optionally, the relative humidity is based on one or more of an ambient temperature, a charge-air temperature, a charge-air pressure, and an ambient humidity, the ambient humidity estimated by a humidity sensor disposed in the charge air cooler. Any or all of the preceding examples further comprises, additionally or optionally, comparing an operating variable of a cooling-air supply device cooling the charge air cooler to an operating variable limit; and decreasing an opening of the cooling-air supply device if the operating variable is less than the operating variable limit. Any or all of the preceding examples further comprises, additionally or optionally, reducing a charge-air pressure downstream of the compressor and upstream of the throttle if the operating variable is less than the operating variable limit. In any or all of the preceding examples, additionally or optionally, the adjusting the cooling air supply is further based on a charge air pressure of the engine. Any or all of the preceding examples further comprises, additionally or optionally, in response to each of higher than threshold relative humidity at the charge air cooler, lower than threshold throttle differential pressure, and lower than threshold operating value of the cooling air supply device, reducing the charge air pressure. In any or all of the preceding examples, additionally or optionally, reducing the charge air pressure includes decreasing a turbocharger compressor speed until the relative humidity at the charge air cooler increases above the threshold relative humidity.

In another example, a method for an engine in a vehicle comprises responsive to condensate accumulation at a charge air cooler (CAC), selectively increasing an opening of a throttle coupled downstream of the CAC and selectively reducing an opening of a grill shutter to reduce airflow across the CAC, wherein the condensate accumulation is based on a relative humidity at the CAC. In the preceding example method, additionally or optionally, the selectively increasing the throttle opening includes increasing the throttle opening when a differential pressure across the throttle valve is higher than a threshold, the throttle opening increased until the differential pressure is at or below the threshold pressure. In any or all of the preceding examples, additionally or optionally, the selectively reducing the grill shutter opening includes reducing the grill shutter opening when a cooling air flow across the grill shutter is higher than a threshold opening, the grill shutter opening reduced until the grill shutter opening is at the threshold opening. In any or all of the preceding examples, additionally or optionally, the grill shutter directs airflow to conditioning condenser of the (AC) system and wherein the threshold opening is further based on an AC system head pressure, the threshold opening increased as the AC system head pressure increases. In any or all of the preceding examples, additionally or optionally, the method further comprising, as the AC system head pressure increases, the grill shutter opening. In any or all of the preceding examples, additionally or optionally, the charge air cooler is coupled downstream of a turbocharger including an intake compressor driven by an exhaust turbine, the method further comprising, responsive to continued condensate accumulation at the charge air cooler after selectively increasing the opening of the throttle and after selectively reducing the opening of the grill shutter, opening an exhaust wastegate valve coupled across the turbine to reduce a boost pressure output by the intake compressor. In any or all of the preceding examples, additionally or optionally, selectively increasing the throttle opening and selectively reducing the grill shutter opening responsive to the condensate accumulation includes responsive to the relative humidity being higher than a threshold humidity, the relative humidity based on one or more of an ambient temperature, a charge-air temperature value, a charge-air pressure, an ambient humidity value, and a humidity value at the CAC estimated by a humidity sensor disposed in the charge air cooler.

In yet another example, a vehicle system comprises an engine, a turbocharger including an intake compressor and an exhaust turbine, a wastegate valve coupled across the exhaust turbine, a charge air cooler (CAC) coupled downstream of the compressor, an air conditioning (AC) system including an AC compressor, a throttle valve coupled downstream of the CAC, active grille shutters at a front end of the vehicle system, the active grill shutters directing ambient airflow to each of the CAC and the AC system, a manifold air pressure (MAP) sensor, an ambient humidity sensor, an ambient temperature sensor, and a controller with computer-readable instructions stored on non-transitory memory for: estimating a condensate level at the charge air cooler based on input from one or more of the ambient humidity sensor, ambient temperature sensor, and manifold pressure sensor, responsive to condensate level being higher than a threshold level when a differential pressure across the throttle valve is higher a threshold pressure, opening the throttle valve while maintaining an opening of the active grille shutters to reduce the differential pressure, and responsive to condensate level being higher than the threshold level when the differential pressure is lower the threshold pressure, maintaining the throttle valve open while reducing the opening of the active grille shutters to reduce cooling airflow to the CAC. In the preceding example system, additionally or optionally, the reducing the opening of the active grill shutters is adjusted based on a head pressure of the AC system, the opening of the active grill shutters reduced to maintain the head pressure below a threshold pressure. In any or all of the preceding examples, additionally or optionally, the controller includes further instructions for: as the AC head pressure increases, increasing the opening of the active grille shutters to increase cooling airflow to the AC compressor. In any or all of the preceding examples, additionally or optionally, the controller includes further instructions for: responsive to condensate level being higher than the threshold level when the differential pressure is lower the threshold pressure, and the AC head pressure is at or above the threshold pressure, opening the exhaust wastegate turbine to reduce a boost pressure downstream of the intake compressor and upstream of the throttle valve.

In a further representation, a method for a boosted engine comprises responsive to condensate accumulation at a charge air cooler coupled downstream of an intake compressor, the intake compressor driven by an exhaust turbine, operating in a first mode with an intake throttle opening increased and an opening of an active grille shutter system maintained, operating in a second mode with the intake throttle opening increased and the opening of the active grille shutter system decreased, and operating in a third mode with the intake throttle opening increased, the opening of an active grille shutter system decreased, and an exhaust wastegate valve opening increased. In the preceding example method, additionally or optionally, operating in the first mode until a differential pressure across the throttle valve is at or below a threshold, and then transitioning to the second mode. In any or all of the preceding examples, additionally or optionally, AGS delivers airflow to both CAC and AGS, the method further comprising operating in the second mode until the opening of the AGS reaches an opening corresponding to a threshold airflow and then transitioning to the third mode, wherein the threshold airflow is based on AC system head pressure.

In this way, by regulating throttle valve differential pressure, AGS position, and charge air pressure, condensation in a CAC may be reduced during conditions triggering a higher condensate formation inside the CAC. By reducing the level of condensate in the CAC, occurrence of misfires caused due to ingestion of water (condensate) in the cylinder may be reduced. The technical effect of altering throttle valve differential pressure for condensate control is that the dew point may be increased without affecting CAC operation, and engine performance. Also, by changing the AGS position, condensate formation as well as condensate accumulation position may be concurrently regulated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising: responsive to condensate accumulation at a charge air cooler (CAC), selectively increasing an opening of a throttle coupled downstream of the CAC and selectively reducing an opening of a grille shutter to reduce airflow across the CAC, the condensate accumulation determined based on a determined relative humidity at the CAC.

2. The method of claim 1, wherein the selectively increasing the throttle opening includes increasing the throttle opening when a differential pressure across the throttle valve is higher than a threshold, the throttle opening increased until the differential pressure is at or below the threshold pressure.

3. The method of claim 1, wherein the selectively reducing the grille shutter opening includes reducing the grille shutter opening when a cooling air flow across the grille shutter is higher than a threshold opening, the grille shutter opening reduced until the grille shutter opening is at the threshold opening.

4. The method of claim 3, wherein the grille shutter directs airflow to an air conditioning (AC) system, and wherein the threshold opening is based on an AC system head pressure, the threshold opening increased as the AC system head pressure increases.

5. The method of claim 4, further comprising, as the AC system head pressure increases, increasing the grille shutter opening.

6. The method of claim 1, wherein the charge air cooler is coupled downstream of a turbocharger including an intake compressor driven by an exhaust turbine, the method further comprising, responsive to continued condensate accumulation at the charge air cooler after selectively increasing the opening of the throttle and after selectively reducing the opening of the grille shutter, opening an exhaust wastegate valve coupled across the turbine to reduce a boost pressure output by the intake compressor.

7. The method of claim 1, wherein selectively increasing the throttle opening and selectively reducing the grille shutter opening responsive to the condensate accumulation includes responsive to the relative humidity being higher than a threshold humidity, the relative humidity based on one or more of an ambient temperature, a charge-air temperature value, a charge-air pressure, an ambient humidity value, and a humidity value at the CAC estimated by a humidity sensor disposed in the charge air cooler.

8. A vehicle system, comprising:
an engine;
a turbocharger including an intake compressor and an exhaust turbine;
a wastegate valve coupled across the exhaust turbine;
a charge air cooler (CAC) coupled downstream of the compressor;
an air conditioning (AC) system including an AC compressor;
a throttle valve coupled downstream of the CAC;
active grille shutters at a front end of the vehicle system, the active grille shutters directing ambient airflow to each of the CAC and the AC system;
a manifold air pressure (MAP) sensor;
an ambient humidity sensor;
an ambient temperature sensor; and
a controller with computer-readable instructions stored on non-transitory memory programmed to:
estimate a condensate level at the charge air cooler based on input from one or more of the ambient humidity sensor, ambient temperature sensor, and manifold pressure sensor;
open the throttle valve while maintaining an opening of the active grille shutters to reduce the differential pressure responsive to the condensate level being higher than a threshold level when a differential pressure across the throttle valve is higher a threshold pressure; and
maintain the throttle valve open while reducing the opening of the active grille shutters to reduce cooling airflow to the CAC responsive to the condensate level being higher than the threshold level when the differential pressure is lower the threshold pressure.

9. The system of claim 8, wherein the reducing the opening of the active grille shutters is adjusted based on a head pressure of the AC system, the opening of the active grille shutters reduced to maintain the head pressure below a threshold pressure.

10. The system of claim 9, wherein the controller includes further instructions for:
as the AC head pressure increases, increasing the opening of the active grille shutters to increase cooling airflow to the AC compressor.

11. The system of claim 8, wherein the controller includes further instructions for:
responsive to condensate level being higher than the threshold level when the differential pressure is lower the threshold pressure, and the AC head pressure is at or above the threshold pressure, opening the exhaust wastegate turbine to reduce a boost pressure downstream of the intake compressor and upstream of the throttle valve.

* * * * *